(12) United States Patent
Chen et al.

(10) Patent No.: US 10,574,875 B2
(45) Date of Patent: Feb. 25, 2020

(54) CAMERA MODULE

(71) Applicants: TRIPLE WIN TECHNOLOGY(SHENZHEN) CO. LTD., Shenzhen (CN); HON HAI PRECISION INDUSTRY CO., LTD., New Taipei (TW)

(72) Inventors: Chia-Wei Chen, New Taipei (TW); Shin-Wen Chen, New Taipei (TW); Ding-Nan Huang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/170,037

(22) Filed: Oct. 25, 2018

(65) Prior Publication Data

US 2019/0387157 A1 Dec. 19, 2019

(30) Foreign Application Priority Data

Jun. 15, 2018 (CN) .......................... 2018 1 0627597

(51) Int. Cl.
```
H04N 5/225      (2006.01)
H04N 5/232      (2006.01)
G03B 3/10       (2006.01)
G03B 7/02       (2006.01)
G02B 7/02       (2006.01)
```
(52) U.S. Cl.
CPC ......... *H04N 5/23212* (2013.01); *G02B 7/021* (2013.01); *G03B 3/10* (2013.01); *H04N 5/2254* (2013.01); *H04N 5/2257* (2013.01)

(58) Field of Classification Search
CPC ............. H04N 5/23212; H04N 5/2257; H04N 5/2254; G02B 7/021; G03B 3/10
See application file for complete search history.

(56) References Cited

U.S. PATENT DOCUMENTS

| | | | |
|---|---|---|---|
| 9,350,976 B2* | 5/2016 | Busse | H04N 5/2253 |
| 2007/0029466 A1* | 2/2007 | Chang | H01L 27/14618 |
| | | | 250/208.1 |
| 2007/0264002 A1* | 11/2007 | Lee | G03B 17/02 |
| | | | 396/275 |
| 2011/0115974 A1* | 5/2011 | Kale | H01L 27/14618 |
| | | | 348/374 |
| 2017/0104022 A1* | 4/2017 | Okamura | H05K 3/4697 |
| 2017/0142308 A1* | 5/2017 | Wang | H04N 5/2253 |
| 2017/0244872 A1* | 8/2017 | Wang | H04N 5/2252 |
| 2017/0264799 A1* | 9/2017 | Wang | H04N 5/2258 |

FOREIGN PATENT DOCUMENTS

CN          207706274          8/2018

* cited by examiner

*Primary Examiner* — Abdelaaziz Tissire
(74) *Attorney, Agent, or Firm* — ScienBiziP, P.C.

(57) ABSTRACT

A camera module comprises a circuit board and a base. A circuit board comprises a first surface and a second surface opposite to the first surface. At least one receiving groove is defined in the first surface. The receiving groove has not extended through the second surface. Each the at least one receiving groove receives an electronic component, and a height of the electronic component is less than a depth of the receiving groove. A base is fixed on the top surface. The at least one receiving groove is covered by the base to seal electronic components. A side surface of the base is aligned with a wall of the receiving groove.

9 Claims, 4 Drawing Sheets

CAMERA MODULE

FIELD

The subject matter relates to a camera module.

BACKGROUND

A camera module comprises a circuit board, electronic components, an image sensor, and a plastic base. During assembly, the electronic components and the image sensor are fixed on the circuit board, and the plastic base is mounted on and covers the image sensor. The lateral size of the plastic base may need to increase to further cover the electronic components. Therefore, the electronic components and plastic base increase the total size of the camera module.

Accordingly, there is room for improvement within the art.

BRIEF DESCRIPTION OF THE DRAWINGS

Implementations of the present technology will now be described, by way of example only, with reference to the attached figures, wherein.

DETAILED DESCRIPTION

Figure 1:
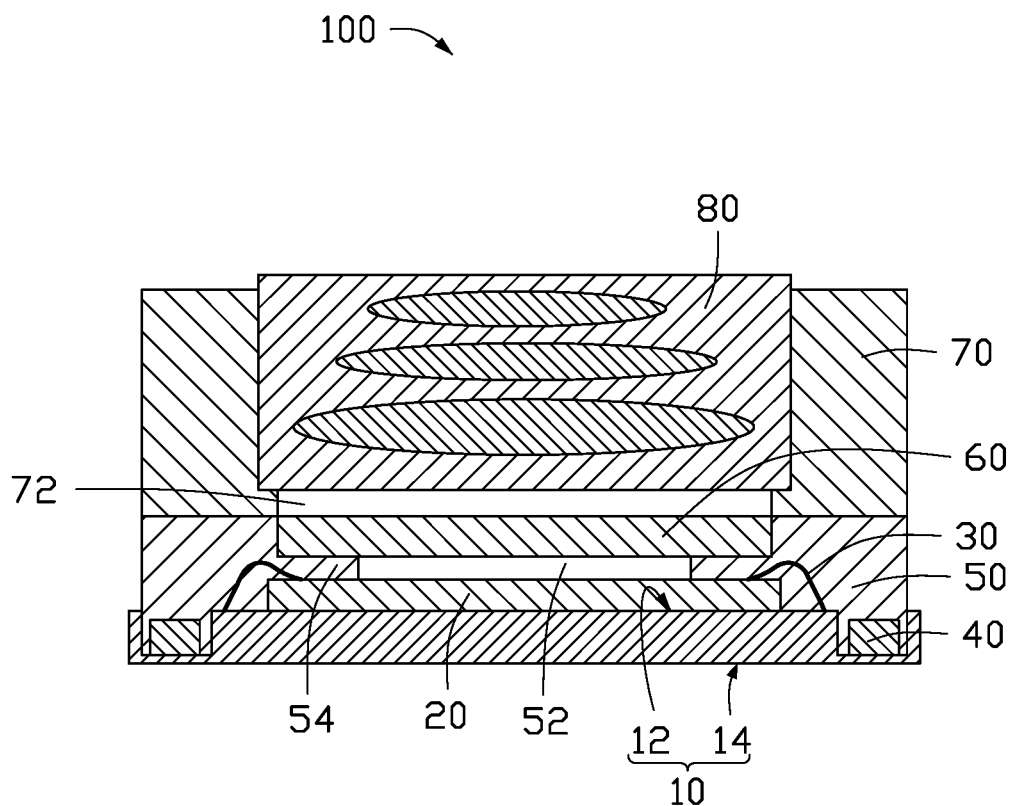
FIG. 1 is a sectional diagram of a first embodiment of a camera module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially rectangular" means that the object resembles a rectangle, but can have one or more deviations from a true rectangle.

The term "comprising," when utilized, means "including, but not necessarily limited to"; it specifically indicates open-ended inclusion or membership in the so-described combination, assembly, series, and the like.

Referring to FIG. 1, the camera module 100 is an auto focus camera module. The camera module 100 includes a circuit board 10, an image sensor 20, a plurality of gold wires 30, a plurality of electronic components 40, a base 50, a filter glass 60, a voice coil motor 70, and a lens barrel 80.

Figure 2:
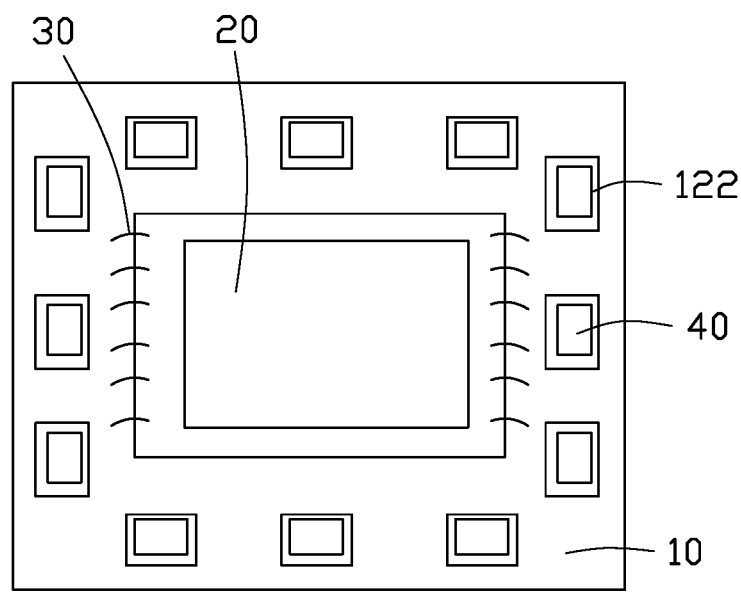
FIG. 2 is a top diagram of the camera module of FIG. 1, when the base 50, the filter glass 60, the voice coil motor 70, and the lens barrel 80 are omitted.

In FIG. 1 and FIG. 2, the circuit board 10 includes a first surface 12 and a second surface 14. The first surface 12 and the second surface 14 are located on opposite surfaces of the circuit board 10. Typically, when in use, the first surface 12 is an upper surface and the second surface 14 is a lower surface. In the embodiment, the first surface 12 is parallel to the second surface 14.

A plurality of receiving grooves 122 are defined on the first surface 12. The receiving grooves 122 does not go through the second surface 14. In the embodiment, each of the receiving grooves 122 has a same shape. The receiving grooves 122 surround the image sensor 20.

The image sensor 20 is fixed on the first surface 12, and is electrically connected to the circuit board 10. In the embodiment, the image sensor 20 is located at a central position of the first surface 12.

The gold wires 30 are configured to electrically connect the circuit board 10 and the image sensor 20. One end of the gold wire 30 is connected to the circuit board 10, and the other end of the gold wire 30 is connected to the image sensor 20.

The electronic components 40 are received in the receiving grooves 122. Each of the electronic components 40 corresponds to one of the receiving grooves 122. A height of the electronic component 40 is less than the depth of its corresponding receiving groove 122.

The base 50 is hollow, and is fixed on the first surface 12. The base 50 covers the receiving grooves 122, the electronic components 40, the gold wires 30, and edges of the image sensor 20, to embed the electronic components 40, the gold wires 30, and the image sensor 20 in the base 50. The base 50 further infills gaps between each receiving groove 12 and the corresponding electronic components 40. A side surface of the base 50 is aligned with an inner wall of the receiving groove 122. An opening 52 is defined in the base 50. The base 50 covers peripherals of the image sensor 20 to fix the image sensor 20 on the circuit board 10. The center of the image sensor 20 is exposed from the opening 52 to form an image area (not labeled). In the embodiment, the base 50 is formed on the first surface 12 by injection molding. A portion of the plastic is injected into the at least one receiving groove 122 to infill the receiving groove 122 and cover the electronic components 40. The base 50 includes a first flange 54. The first flange 54 protrudes from a center of an inner wall of the opening 52. The image sensor 20 is fixed between the circuit board 10 and the first flange 54.

The filter glass 60 is fixed on the first flange 54, and is positioned above and spaced apart from the image sensor 20.

The voice coil motor 70 is fixed on the base 50. A side wall of the voice coil motor 70 is aligned with the side wall of the base 50. A hole 72 is defined in the voice coil motor 70. The hole 72 goes through the voice coil motor 70. The filter glass 60 is exposed from the hole 72.

The lens barrel 80 is housed in the hole 72. The lens barrel 80 is driven by the voice coil motor 70 to achieve autofocus function.

During assembly, the image sensor 20 is fixed at the center of the first surface 12, the gold wires 30 electrically connects the circuit board 10 and the image sensor 20, and the electronic components 40 are placed in the receiving groove 122. The base 50 is formed on the circuit board 10 and the image sensor 20 by injection molding, and the base 50 is positioned on the receiving groove 122 and covers the receiving grooves 122, the electronic components 40, the gold wires 30, and edges of the image sensor 20. At this time, a side surface of the base 50 is aligned with the inner wall of the receiving groove 122. The filter glass 60 and the voice coil motor 70 are sequentially assembled on the base 50, and the lens barrel 80 is installed in the hole 72, thereby completing assembly of the camera module 100.

Figure 3:
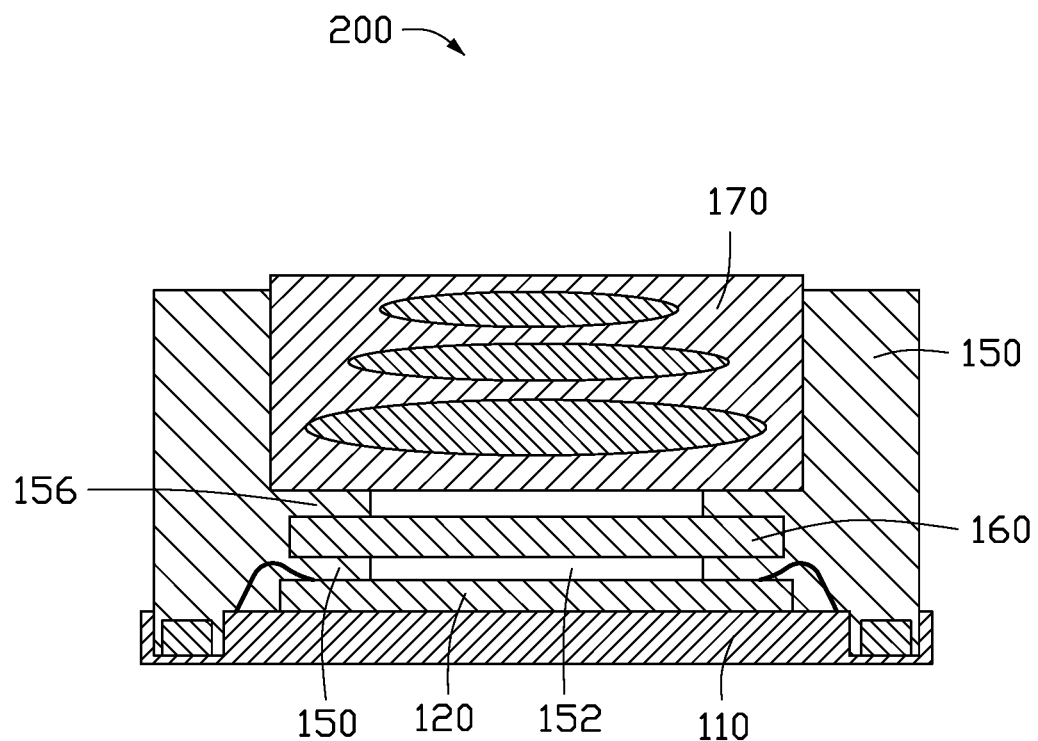
FIG. 3 is a sectional diagram of a second embodiment of a camera module.

FIG. 3 shows a camera module 200 of a second embodiment. Different from the camera module 100, the camera module 200 is a fixed-focus camera module. The camera module 200 includes a circuit board 110, an image sensor 120, a base 150, a filter glass 160, and a lens barrel 170. An opening 152 is defined in the base 150. The image sensor 120 is fixed on the circuit board 110 and housed in the opening 152. The base 150 includes a first flange 154 and a second flange 156. The first flange 154 and the second flange 156 both protrude from a center of an inner wall of the opening 152. The first flange 154 is disposed adjacent to the circuit board 110, and the second flange 156 is disposed away from the circuit board 110. The filter glass 160 is fixed between the first flange 154 and the second flange 156. The lens barrel 170 is positioned on the second flange 156, and is spaced apart from the filter glass 160.

Figure 4:
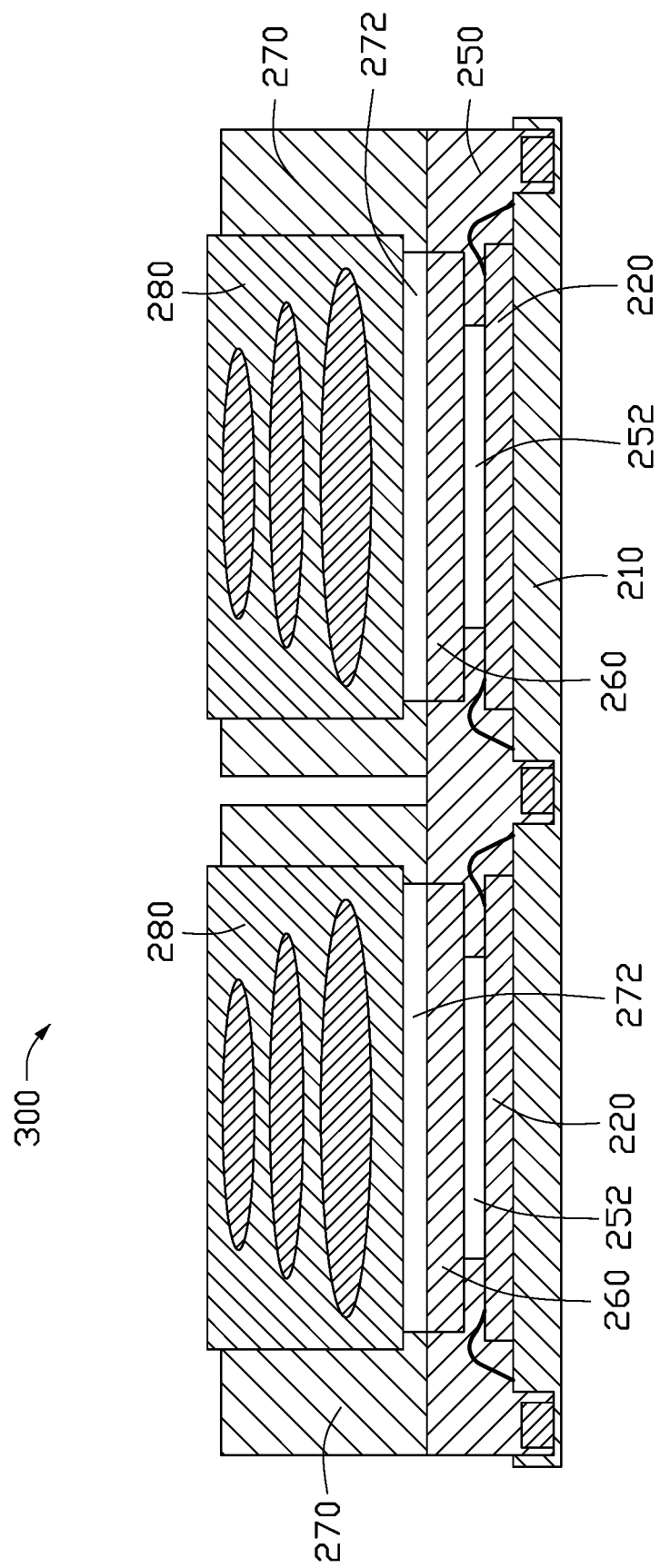
FIG. 4 is a sectional diagram of a third embodiment of a camera module.

FIG. 4 shows a camera module 300 of a third embodiment. Different from the camera module 100, the camera module 300 is a dual lens module. The camera module 300 includes a circuit board 210, two image sensors 220, a base 250, two filter glasses 260, two voice coil motors 270, and two lens barrels 280. Two openings 252 are defined in the base 250. The openings 252 go through the base 250 and are spaced apart from each other. The two image sensors 220 are respectively received in the two openings 252 and are in contact with the circuit board 210. The base 250 includes two first flanges 254. The two first flanges 254 protrude from a center of an inner wall of its corresponding opening 252. The image sensor 220 is located between the circuit board 210 and the first flange 254. The two filter glasses 260 are respectively positioned on the two first flanges 254 and are respectively spaced apart from the two image sensors 220. The two voice coil motors 270 are spaced apart from the base 250, and correspond to the two openings 252, respectively. Each voice coil motors 270 define a hole 272. The two lens barrels 280 are respectively received in the two holes 272.

In the camera modules 100, 200, and 300, the plurality of receiving grooves 122 are defined in the circuit boards 10, 110, and 210, and the electronic components 40 are received in the plurality of receiving grooves 122. Therefore, the electronic components 40 are embedded in the circuit board 10, 110, 210, so that the lateral size of the base 50, 150, 250 does not need to be increase. It can reduce the lateral size of the camera module, thereby reducing the total size of the camera module.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A camera module comprising:
   a circuit board comprising a first surface and a second surface opposite to the first surface, at least one receiving groove defined on the first surface;
   at least one electronic component, each electronic component received in one receiving groove, a height of the electronic component less than a depth of the receiving groove; and
   a base fixed on the top surface, the at least one receiving groove covered by the base to cause the electronic component to be embedded in the base, a side surface of the base aligned with an inner wall of the at least one receiving groove.

2. The camera module of claim 1, wherein the base is formed on the first surface by injection molding, the base further infills gap between each receiving groove and the corresponding electronic component.

3. The camera module of claim 1, further comprising an image sensor, wherein an opening is defined in the base, the image sensor is positioned on the first surface, and is received in the opening, edges of the image sensor are embedded in the base, a center of the image sensor is exposed from the opening.

4. The camera module of claim 3, further comprising a plurality of gold wires, wherein the plurality of gold wires connects the image sensor to the circuit board.

5. The camera module of claim 4, further comprising a filter glass, wherein the base comprises a first flange protruding from a center of an inner wall of the opening, the filter glass is placed on the first flange, and is spaced apart form the image sensor.

6. The camera module of claim 5, further comprising a voice coil motor and a lens barrel, wherein the voice coil motor is fixed on the base, and the lens barrel is positioned in the voice coil motor, and is spaced apart from the filter glass.

7. The camera module of claim 5, further comprising a lens barrel, wherein the base comprises a second flange protruding from a center of an inner wall of the opening, the first flange is disposed adjacent to the circuit board, and the second flange is disposed away from the circuit board, the lens barrel is positioned on the second flange and is spaced apart from, the filter glass.

8. The camera module of claim 7, wherein the camera module is a dual-lens camera module, the camera module comprises two voice coil motors and two lens barrels, two openings are defined in the base, the two openings to each other, the two voice coil motors are fixed on the base, face to the two openings, and the two lens barrels are respectively accommodated in the two voice coil motors.

9. The camera module of claim 8, further comprising two image sensors and two filter glasses, wherein each of image sensors corresponds to one of the filter glasses and one of the lens barrels, and is fixed in the groove.

* * * * *